United States Patent [19]

Yamauchi et al.

[11] Patent Number: 5,166,336
[45] Date of Patent: Nov. 24, 1992

[54] METHOD FOR PRODUCTION OF A CORN MILLING RESIDUE CARBOXYMETHYL ETHER SALT

[75] Inventors: Toshio Yamauchi; Masao Sasaki, both of Kyoto, Japan

[73] Assignee: Dai-Ichi Kogyo Seiyaku Co., Ltd., Kyoto, Japan

[21] Appl. No.: 605,637

[22] Filed: Oct. 29, 1990

[30] Foreign Application Priority Data

Nov. 1, 1989 [JP] Japan ................... 1-286514

[51] Int. Cl.$^5$ ............................... C08B 11/04
[52] U.S. Cl. ................... 536/124; 536/1.1; 536/97; 536/98; 536/120
[58] Field of Search .............. 536/1.1, 97, 98, 120, 536/124

[56] References Cited

U.S. PATENT DOCUMENTS 3,596,766  8/1971  Johnston ................ 536/111
4,243,479  1/1981  Tessler ................... 536/50

FOREIGN PATENT DOCUMENTS 275295   10/1929  Japan .
59-41642 10/1984  Japan .

OTHER PUBLICATIONS

Denpun Kagaku Handbook (Handbook of Starch Science), Asakura Shoten, 1977, Jul, p. 361.

*Primary Examiner*—Nathan M. Nutter
*Assistant Examiner*—Jeffrey Culpeper Mullis
*Attorney, Agent, or Firm*—Jordan and Hamburg

[57] ABSTRACT

A process for producing a corn milling residue carboxymethyl ether salt comprises reacting a corn milling residue with alkali in the presence of an aqueous carboxymethylating agent solution to give a corn milling residue carboxymethyl ether salt with an average degree of substitution not less than 0.2. As the reaction medium, water alone is used in a proportion of at least 7 moles per mole of the corn milling residue. Carboxymethylation of the corn milling residue is accomplished evenly and smoothly.

5 Claims, No Drawings

METHOD FOR PRODUCTION OF A CORN MILLING RESIDUE CARBOXYMETHYL ETHER SALT

BACKGROUND OF THE INVENTION

The present invention relates to a method for producing a corn milling residue carboxymethyl ether salt.

Starch milling residue (coarse grains on sieve) available as a byproduct of starch industry contains, in addition to the major components starch and cellulose, large proportions of crude protein, ashes and other impurities (composition of a typical starch milling residue: starch 54.4%, crude fiber 18.6%, ashes 8.7%, crude protein 1.8%, etc.; cf. Jiro Nikuni (ed): Denpun Kagaku Handbook (Handbook of Starch Science), Asakura Shoten, 1977). For this reason, there is not known a process for converting such a milling residue to a carboxymethyl ether salt on a commercial scale and the only use for such byproduct that is known today is as an inexpensive feedstuff.

On the other hand, the technology of carboxymethylating each of starch and cellulose, both of which are major components of the milling residue as aforesaid, is well known. For example, it is known to react each of them with chloroacetic acid or a salt or derivative (e.g. ester) thereof in the presence of alkali in a reaction medium such as water, a mixture of water and a hydrophilic organic solvent such as 2-propanol or a mixture of ethanol, benzene and water.

However, if such a conventional process for carboxymethylation of starch is applied to a corn milling residue, the aqueous slurry will not be sufficiently homogenous because the contaminant cellulose is hard to react. On the other hand, if the conventional carboxymethylation process for cellulose is applied to the corn milling residue, the concomitant starch is gelatinized in the course of reaction so that no satisfactory result can be obtained, either.

In addition, since the conventional process employing organic solvents (the so-called organic solvent process) involves the use of different solvents for reaction and purification, the reclaiming of used solvents imposes a serious limitation on the operation. For example, when 2-propanol is used for the reaction solvent, the recovery of the solvent after completion of the reaction is hampered by gelatinization of the system. If it is not recovered, however, 2-propanol finds its way into the purification solvent (aqueous methanol) and fractional distillation becomes essential for separation of the two solvents.

In the aqueous solvent process employing water, the reaction must be conducted at low temperature for a protracted time in order to avoid gelatinization which is inevitable at high temperature, so that the productivity is sacrificed of necessity.

A process using methanol as the solvent is also known (Japanese Patent Publication No. 27-5295) but it is not effective for carboxymethylation of a corn milling residue and, hence, does not yield a water-soluble reaction product.

Aside from the above-mentioned processes, it has been proposed to carboxymethylate starch in slightly wet condition (Japanese Patent Publication No. 59-41642) but the degree of substitution of the product is in the neighborhood of 0.3. Furthermore, application of this process to a corn milling residue does not yield a homogenous solution.

SUMMARY OF THE INVENTION

The object of the present invention is to provide a commercially useful process by which a corn milling residue can be uniformly and easily carboxymethylated.

The method of the present invention comprises reacting a corn milling residue with alkali in the presence of an aqueous solution containing a carboxymethylating agent to produce a corn milling residue carboxymethyl ether salt with an average degree of substitution not less than 0.2. With regard to the reaction medium, water alone is used in a proportion of not less than 7 moles per mole of the corn milling residue (as calculated with the molecular weight of cyclized glucose in cellulose being assumed as 162; the same applies hereinafter).

DETAILED DESCRIPTION OF THE PREFERRED EMBODIMENTS

The parameters important to the construction of the present invention are itemized and explained below.

(1) Corn milling residue

The starting material corn milling residue of the present invention can be prepared by the conventional procedure of removing the germ from the corn seed, milling the remainder in the presence of water and recovering coarse grains from the resulting sludge by filtration, centrifuging the same and finally drying it.

(2) Alkali

The alkali is preferably a strong alkali such as sodium hydroxide or potassium hydroxide and, more desirably from commercial points of view, sodium hydroxide. The alkali is used in the form of an aqueous solution.

(3) Carboxymethylating agent

The carboxymethylating agent is preferably a monohaloacetic acid or a salt thereof, such as monochloroacetic acid, sodium monochloroacetate, etc., or a mixture thereof. The carboxymethylating agent is used in the form of an aqueous solution.

(4) Reaction medium

In the present invention, water is used as the reaction medium. This water is used in a proportion of not less than 7 moles per mole of the corn milling residue. If the proportion of water is less than 7 moles, it is impossible to obtain a homogenous aqueous solution of the carboxymethyl ether salt. There is no upper limit to the proportion of water in terms of the effect of the invention but from the standpoint of ease of handling of the product aqueous solution of carboxymethyl ether salt, 13 moles per mole of corn milling residue is the preferred maximum.

(5) Reaction and purification

The reaction is conducted by adding a carboxymethylating agent, previously dissolved in water, to a corn milling residue, mixing them at a temperature of 10° to 30° C., adding an aqueous solution of alkali, stirring the mixture at a temperature of 20° to 40° C., and conducting carboxymethylation at a temperature of 65° to 95° C.

It should be understood that an appropriate quantity of water may be added to the corn milling residue beforehand.

The resulting crude reaction product may, if required, be washed with 65~80% aqueous methanol, dried and pulverized to give a final product.

In accordance with the present invention, the carboxymethylation of a corn milling residue which has so far been difficult to accomplish can be accomplished with uniformity and smoothly by reacting the corn milling residue with said alkali in the presence of an aqueous carboxymethylating agent solution in a properly selected quantity of reaction medium water.

As a consequence, starting with a cellulose-containing corn milling residue which is available at low cost, carboxymethylated starch finding a broad range of uses such as printing size, drilling sludge admixture, concrete dispersant, adhesive, feedstuff or feed binder, antidusting agent, etc. can be manufactured on a commercial scale at low cost. As such, the contribution of the present invention to the industry and the users is remarkable.

The following examples and comparative examples are intended to illustrate the present invention in further detail and should by no means be construed as defining the metes and bounds of the invention.

EXAMPLE 1

A universal blender-mixer (manufactured by Shinagawa Kogyo Seisakusho, Ltd.) was charged with 150 weight parts of a dried corn milling residue (polysaccharide content 85%), and 43.6 weight parts of monochloroacetic acid dissolved in 69.2 weight parts of water at a final concentration of 38.65 weight % was added dropwise over a period of 1 minute. The mixture was further stirred at 25° C. for 10 minutes.

To this mixture was added dropwise an aqueous alkali solution prepared by dissolving 39.9 weight parts of sodium hydroxide in 69.2 weight parts of water at a final concentration of 36.57 weight % over a period of 1 minute. The mixture was stirred at 35° C. for 10 minutes and, then, cast into a sheet with a thickness of 10 mm.

Then, this sheet was placed in an incubator for carboxymethylation at 90° C. for 70 minutes, at the end of which time the sheet was taken out, crushed in a mixer, dried and finely-divided.

The above product was further pulverized in a mixer and 70% methanol was added. After neutralization with acetic acid, the solid fraction was separated by centrifugation, dried, and further pulverized to give the desired corn milling residue carboxymethyl ether sodium salt.

In this example, the quantity of water used per mole of corn milling residue was 10 moles.

EXAMPLES 2 AND 3

The procedure of Example 1 was repeated using the same quantities of corn milling residue and water as used in Example 1 except that the amounts of monochloroacetic acid (MCA) and sodium hydroxide (NaOH) were varied as indicated in Table 1.

TABLE 1

|  | Aqueous solution of monochloroacetic acid | | | Aqueous solution of sodium hydroxide | | | Number of moles of water per mole of corn milling residue |
| --- | --- | --- | --- | --- | --- | --- | --- |
|  | MCA (parts) | Water (parts) | Concentration (%) | NaOH (parts) | Water (parts) | Concentration (%) |  |
| Example 2 | 59.5 | 69.2 | 46.23 | 52.0 | 69.2 | 42.90 | 10 |
| Example 3 | 74.4 | 69.2 | 51.81 | 64.5 | 69.2 | 48.24 | 10 |

COMPARATIVE EXAMPLES 1 and 2

The procedure of Example 1 was repeated except that a portion of water (reaction medium) was replaced with methanol (MeOH) or a mixture of methanol (MeOH) and isopropyl alcohol (IPA).

TABLE 2

|  | Solution of monochloroacetic acid | | | | | Solution of sodium hydroxide | | | | |
| --- | --- | --- | --- | --- | --- | --- | --- | --- | --- | --- |
|  | IPA (parts) | MeOH (parts) | MCA (parts) | Water (parts) | Concentration (%) | IPA (parts) | MeOH (parts) | NaOH (parts) | water (parts) | Concentration (%) |
| Comparative Example 1 | — | 20 | 43.6 | 80 | 30.36 | — | 20 | 39.9 | 80 | 28.52 |
| Comparative Example 2 | 97.5 | 22.5 | 43.6 | 30 | 22.52 | 97.5 | 22.5 | 39.9 | 30 | 21.01 |

With regard to the corn milling residue carboxymethyl ether sodium salts obtained in Examples 1 through 3 and Comparative Examples 1 and 2, the degrees of substitution, viscosities, properties and the effective utilization rates of the carboxymethylating agent are set forth in Table 3. It will be apparent from this table that the present invention provides a very efficient process insuring an exceedingly high utilization rate of the carboxymethylating agent.

TABLE 3

|  | Example | | | Comparative Example | |
| --- | --- | --- | --- | --- | --- |
|  | 1 | 2 | 3 | 1 | 2 |
| Degree of substitution (D.S.)[*1] | 0.58 | 0.73 | 0.86 | 0.45 | 0.43 |
| Effective utilization rate[*2] (%) | 96.66 | 91.25 | 86.00 | 76.79 | 73.37 |
| Viscosity[*3] (CPS) | 26 | 32 | 28 | 22 | 36 |
| Gelation[*4] (ml) | 0 | 0 | 0 | 2 | 5 |

[*1]Each sample was reduced to ashes and boiled in water and N/10 sulfuric acid. After cooling, the excess acid was back-titrated with N/10 potassium hydroxide and the degree of substitution was calculated by means of the following equation.

$$\text{Degree of substitution} = \frac{162 \times A}{10,000 - (80 \times A)}$$

A: mol of N/10 sulfuric acid consumed by bound alkali in 1 g of sample.
162: MW of glucose
80: MW of $CH_2COONa-H$
[*2]The degree of substitution per mole of the carboxymethylating agent used.
[*3]Determined with a B-type viscometer fitted with a No. 3 rotor at a rotor speed of 30 rpm.
[*4]Ten grams of 2% solution was diluted with 90 g of water and a measuring cylinder was filled with the dilution up to 50 ml. The cylinder was left standing for 1 week and the volume of the gels formed in the lower part of the cylinder was measured.

What is claimed is:

1. A process for producing a corn milling residue carboxymethyl ether salt, comprising (a) adding an aqueous solution of a carboxymethylating agent to a corn milling residue and mixing them, (b) then to the mixture thus formed adding an aqueous solution of alkali and stirring, (c) then casting the mixture into a sheet, reaction medium in the mixture consisting of water and the proportion of water in the mixture being 7 to 13 moles per mole of the corn milling residue, and then (d) heating the sheet at a temperature of 65° to 95° C. thereby to effect carboxymethylation to produce said corn milling residue carboxymethyl ether salt.

2. The process of claim 1 wherein water alone is used as the reaction medium in a proportion of 7 to 13 moles per mole of the corn milling residue.

3. The process of claim 1 wherein the carboxymethylating agent is a monohaloacetic acid or a salt thereof or a mixture thereof.

4. The process of claim 1 wherein the carboxymethylating agent is monochloroacetic acid or sodium monochloroacetate or a mixture thereof.

5. The process of claim 1 wherein said alkali is sodium hydroxide or potassium hydroxide or a mixture thereof.

* * * * *